United States Patent
Deivasigamani et al.

(10) Patent No.: US 9,961,044 B2
(45) Date of Patent: May 1, 2018

(54) ROUTERLESS IDENTIFICATION CODE ASSIGNMENT SYSTEM AND METHOD

(71) Applicants: Sridhar Deivasigamani, Peoria, IL (US); Sivaprasad Akasam, Dunlap, IL (US)

(72) Inventors: Sridhar Deivasigamani, Peoria, IL (US); Sivaprasad Akasam, Dunlap, IL (US)

(73) Assignee: Intellihot, Inc., Galesburg, IL (US)

( * ) Notice: Subject to any disclaimer, the term of this patent is extended or adjusted under 35 U.S.C. 154(b) by 421 days.

(21) Appl. No.: 14/498,775

(22) Filed: Sep. 26, 2014

(65) Prior Publication Data

US 2015/0084749 A1    Mar. 26, 2015

Related U.S. Application Data

(60) Provisional application No. 61/883,172, filed on Sep. 26, 2013.

(51) Int. Cl.
*H04L 29/12*    (2006.01)

(52) U.S. Cl.
CPC ...... *H04L 61/2092* (2013.01); *H04L 61/2038* (2013.01)

(58) Field of Classification Search
CPC ............. H04L 61/2038; H04L 61/2092; H04L 29/1232; H04W 84/18
See application file for complete search history.

(56) References Cited

U.S. PATENT DOCUMENTS

| | | | | |
|---|---|---|---|---|
| 5,502,818 A | * | 3/1996 | Lamberg | B66B 1/34 340/7.53 |
| 5,758,282 A | * | 5/1998 | Yamashina | H04L 29/12264 370/437 |
| 6,216,172 B1 | * | 4/2001 | Kolblin | H04L 29/12254 709/227 |
| 7,414,996 B2 | * | 8/2008 | Fan | H04L 29/12009 370/338 |
| 2004/0189465 A1 | * | 9/2004 | Capobianco | G08B 21/22 340/539.23 |

(Continued)

FOREIGN PATENT DOCUMENTS

EP    1271848    1/2003

*Primary Examiner* — Nay Tun
(74) *Attorney, Agent, or Firm* — Tracy Jong Law Firm; Tracy P. Jong; Cheng Ning Jong

(57) ABSTRACT

A system and method for uniquely self-identifying a controller functionally connected to a communication network of at least two controllers, the system comprising the at least two controllers, each controller having a random code generator configured for generating a resident identification code, a transmitter, a receiver and a volatile memory. The transmitter is configured for broadcasting the resident identification code to the communication network. The receiver is configured for receiving an external identification code broadcasted from another controller and storing the external identification code in the volatile memory. The external identification code is compared to the resident identification code and if a match exists, the resident identification code is replaced by another resident identification code determined in the controller. The resident identification code is broadcasted to the communication network otherwise.

8 Claims, 3 Drawing Sheets

(56) References Cited

U.S. PATENT DOCUMENTS

| | | | |
|---|---|---|---|
| 2007/0195729 A1* | 8/2007 | Li | H04L 29/1232 370/328 |
| 2010/0189029 A1* | 7/2010 | Jing | H04L 29/1232 370/328 |
| 2010/0299401 A1* | 11/2010 | Lloyd | G06F 15/16 709/209 |
| 2012/0071221 A1* | 3/2012 | Palexas | G07F 17/3223 463/16 |
| 2012/0254958 A1* | 10/2012 | Budampati | H04L 61/2038 726/6 |
| 2014/0280369 A1* | 9/2014 | Poole | G06F 17/30339 707/803 |

* cited by examiner

ROUTERLESS IDENTIFICATION CODE
ASSIGNMENT SYSTEM AND METHOD

PRIORITY CLAIM AND RELATED
APPLICATIONS

This non-provisional application claims the benefit of priority from provisional application U.S. Ser. No. 61/883,172 filed on Sep. 26, 2013. Said application is incorporated by reference in its entirety.

BACKGROUND OF THE INVENTION

1. The Field of the Invention

The present invention is directed generally to a system and method for assigning identification codes to controllers connected to a communication network. More specifically, the present invention is directed to a system and method for assigning identification codes to controllers adapted to control water heaters, air heating and cooling devices, home comfort devices and other appliances where the controllers are connected to a communication network.

2. Background Art

In a conventional means for identifying controllers in a network environment without a router, the controllers functionally connected to the network may be preprogrammed to start their identification routines at different times from the moments they are powered up. Therefore, in such controllers, the time at which each controller is identified must be preprogrammed to be unique among the networked controllers or a conflict may occur as an identification code assigned to a controller may not be unique. In some cases, unique identification codes may also be assigned to each controller manually. These preprogrammed and/or manual steps may be eliminated if each controller is able to automatically generate and assign a unique identification code to itself.

European Pat. No. 1271848 to Shintani et al. (hereinafter Shintani) discloses a system where a unique identification code is given to each appliance in each sub-network of a home network. One router is used as a parent router and only the router is made to manage the identification codes (IDs). The IDs include the IDs of the sub-networks and the IDs of the appliances in the sub-networks. Information about the year when an ID is assigned is given to the ID. After a certain period of time, the presence of each ID is checked. Each appliance has information about the grade of the system, and the information is utilized for updating the appliance having a router function when an appliance is newly installed. Shintani requires a separate router for generating and reporting identification codes while in the present assignment system self-assigns a unique identification number, thereby requiring no additional hardware or software for achieving such purpose.

Thus, there arises a need for a means for automatically identifying discrete controllers within a communication network to facilitate communication between such controllers where such means does not require one or more manual steps to accomplish, an external router or hardware or embedding a serial number at the time of manufacturing of the controllers.

SUMMARY OF THE INVENTION

The present invention is directed toward a system for uniquely self-identifying a controller functionally connected to a communication network of controllers. Each controller includes a random code generator configured for generating a resident identification code, a transmitter, a receiver and a volatile memory. The transmitter is configured for broadcasting the resident identification code to the communication network. The receiver is configured for receiving an external identification code broadcasted from one of the other controllers and storing the external identification code in the volatile memory. The external identification code is compared to the resident identification code. If a match exists, the resident identification code is replaced by another resident identification code that is created in the controller and if the resident identification code is not identical to the external identification code, the resident identification code is broadcasted to the communication network.

Each resident identification code or external identification code can include a numeric character, an alphabetic character and a combination thereof.

Accordingly, it is a primary object of the present invention to provide a system and method for assigning identification codes to controllers connected to a communication network without hardcoding serial numbers during manufacturing or installation of devices controlled by the controllers.

It is another object of the present invention to provide a system and method for automatically assigning identification codes to controllers when they are connected in a network.

It is another object of the present invention to provide a system and method for automatically assigning identification codes to controllers that does not require a dedicated controller or router.

It is another object of the present invention to provide a system and method for automatically assigning identification codes to controllers that minimizes potential collisions of messages broadcasted during the period in which identification codes are established.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—controller
4—communication network
6—step of broadcasting resident identification code
10—step of starting random timer
12—step of receiving external identification code
14—step of generating resident identification code
16—step of random timer expiring
18—step of comparing resident identification code to external identification code
20—step of saving external identification code to volatile memory
22—step of verifying identification code
24—step of generating a resident identification code
26—step of starting wait timer
28—step of wait timer expiring
30—step of determining the next available identification code
32—seed value
34—time saving

PARTICULAR ADVANTAGES OF THE INVENTION

The present identification code assignment system eliminates the need to have hardcoded (often factory set or manually set during installation) serial numbers. The creation and maintenance of such system can be avoided, thereby simplifying record keeping of a plurality of uniquely identifiable controllers and simplifying the effort in uniquely identifying a plurality of controllers. As the number of controllers that are connected in a network is generally small, the present system which takes advantage of the utilization of identification codes that are made up of a small number or small string of alphabetic characters or the combination of a small number and alphabetic characters, provides the ability to uniquely identify a controller simply, automatically and with little computational overhead. In addition, as manual steps can be eliminated, the potential for installation errors can be eliminated.

In one embodiment, small sequential numbers are used to identify controllers, simplifying the processing of the identification codes.

A common process can be used in the assignment of identification codes to an initial power-up of a network or dynamic addition of one or more controllers to an already established network, i.e., the identification code of one or more controllers can be established while an already established network is not required to be powered down.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
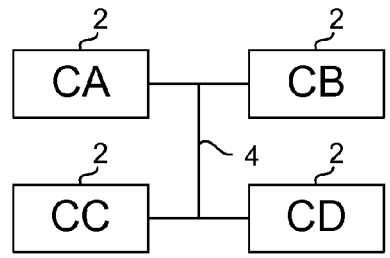
FIG. 1 is a diagram depicting a plurality of controllers connected to a communication network.

FIG. 1 is a diagram depicting a plurality of controllers 2, i.e., CA, CB, CC and CD, connected to a communication network 4. A communication network as used herein, can include, but not limited to a network using a protocol including Wi-Fi (local area wireless technology), Controller Area Network (CAN), Bluetooth and any communication protocols used in wireless or wired communications. In some embodiments of today's large or commercial water heating systems, a controller is paired with a heating exchanger which the controller controls. In other embodiments, only one controller is used to control a plurality of heat exchangers or a large heat exchanger. The present identification code assignment system and method applies to the former scenario as a total hot water demand is serviced by more than one heat exchanger in a system. As the total hot water demand is cooperatively met by a plurality of heat exchangers functionally connected to the system, it is important to assign the amount of contribution required of each of the heat exchangers contributing to the total hot water demand. In doing so, each heat exchanger must be identified as the amount of contribution may vary from one heat exchanger to another. As the controller of a water heating system is responsible for setting the conditions commensurate with the contribution of heating requested of the water heating system, the controller must be identifiable within a network. Upon connecting a controller 2 to a communication network 4, the controller 2 is functionally connected to other controllers 2 in the network. Each controller 2 includes a random code generator configured for generating a resident identification code, a transmitter, a receiver and a volatile memory.

Figure 2:
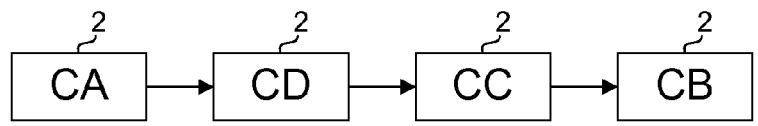
FIG. 2 is a diagram depicting the sequence in which controllers are identified in the ensuing example depicted in FIG. 3.
Figure 3:
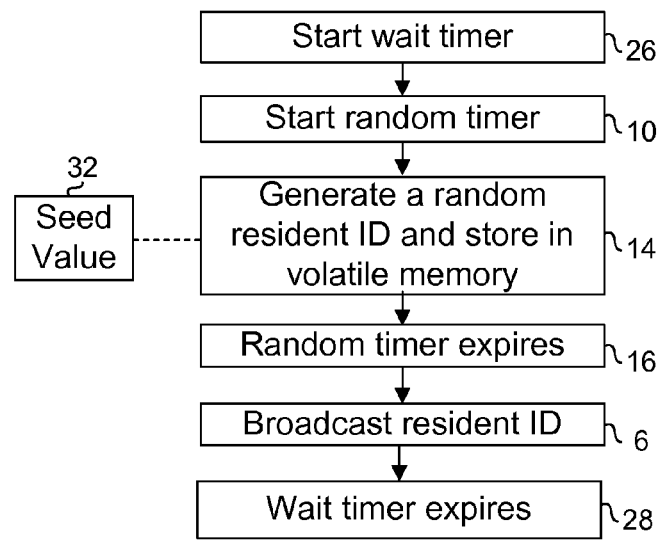
FIG. 3 is a flow diagram depicting a scenario in which a controller is initialized.

FIG. 2 is a diagram depicting the sequence in which controllers 2 are identified in the ensuing example depicted in FIG. 3. In this example, CA is identified first, followed by CD, CC and eventually CB. FIG. 3 is a flow diagram depicting a scenario in which a controller is initialized. Upon power-up, each controller first generates and starts a preprogrammed wait timer as shown in step 26 of FIG. 5, e.g., an amount of time sufficient for all of the permitted number of controllers in a network to establish their identification codes and waits until this identification code establishing phase has completed or when the wait timer has expired as shown in step 28. During this waiting period, i.e., the period between the start of the wait timer and the expiration of the wait timer, any controller having previously established identification code may communicate via the network. However, the activities requiring all of the controllers to have been identified shall be performed only after the wait timer has expired. The wait timer of each controller in a common network shall be set to the same value as the wait timer represents the period within which the identification codes of all controllers in the network are established. The expiration of the wait timer marks the point in time when the controllers have been identified.

During a dynamic identification code establishing phase, i.e., when one or more new controllers are added to an already established network of controllers, the identification code establishing phase of the one or more new controllers is no different in this scenario as in a general scenario when all controllers in the network are required to establish their identification codes. The frequency at which each established controller broadcasts at least one message to the communication network is configured to coincide with the wait timer, i.e., each established controller is expected to broadcast at least one message within the length of the wait timer. This is done to guarantee that any controller having previously established identification code will broadcast a message at least once during this time period such that its assigned identification code is known to other controllers in the network. In one embodiment, the identification code of a controller is embedded in a routinely broadcasted message by its sender, e.g., for communicating the outlet temperature of the heat exchanger it controls, etc. Therefore, no deliberate messages used only to establish an identification code in a newly added controller is necessary. The ability to add a controller without first taking other already established controllers offline makes reboot of the controllers unnecessary. In practice, it may even be impossible to take any existing controllers offline as uninterrupted services are required during the period in which a new controller is required to be added.

During the period in which the wait timer is active, the controller is configured to generate and start a timer of a random duration as in step 10. This random duration however must be shorter than that of the wait timer. An identification code of a random value is then generated and stored in its volatile memory as in step 14. A random timer (or timer having the random duration) is used to randomize the event at which an identification code is determined in a controller such that the potential for two or more controllers to act on establishing identification codes simultaneously is greatly reduced. Upon expiration of the random timer (step 16), the transmitter is configured for broadcasting the resident identification code to the communication network 4. The resident identification code is now the identification code of the controller from which the resident identification code has just been transmitted. The steps shown in FIG. 3 are those followed by the first controller to self-identify as, at the time the controller self-identifies, there are no communications from another controller. In one embodiment, the resolution of the random timer is 0.01 second or finer, e.g., 0.01 second, 0.001 second, etc. . . . In another embodiment, the resolution of the random timer is coarser than 0.01 second, e.g., 1 second, 10 seconds, etc. .

Figure 4:
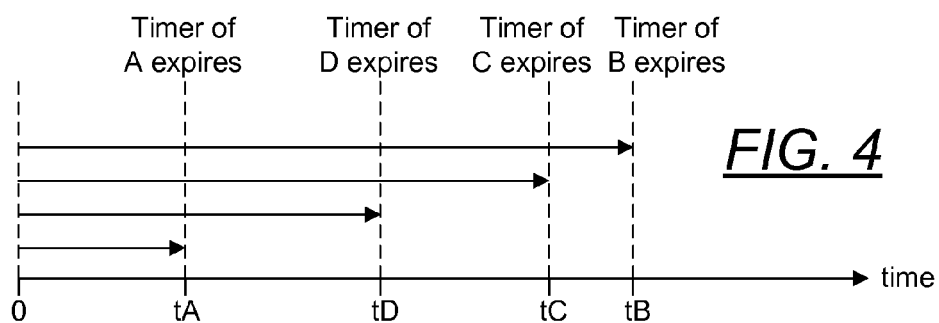
FIG. 4 is a timeline depicting the expirations of random timers in a plurality of controllers connected to a network.

FIG. 4 is a timeline depicting the expirations of random timers in the plurality of controllers 2 connected to a network 4 as shown in FIGS. 1 and 2. It shall be noted, in this example, that the order in which a controller is identified is the order in which the random timer of the controller expires. Therefore, the timer of CA expires first at tA, followed by the expirations of timers of CD, CC and CB at tD, tC and tB, respectively. The random timer of each controller in a network is preferably set to the identical resolution. For example, a controller in a network preferably starts to communicate at time intervals of 0.1 second, 0.2 second, 0.3 second, etc. . . . It is then possible that two or more controllers can broadcast simultaneously which can then cause a condition referred to as collision. As it takes a finite amount of time to transmit a message, a broadcast is not considered complete until it has been received by its intended audience and a time offset has elapsed. When a collision occurs, the controllers involved in the collision are not considered to have established their identification codes as race conditions can result in two or more controllers having identical identification codes. At the controller hardware level, when a collision occurs, an interrupt line of a receiving controller is activated, preventing the transmission of a broadcast indicating that the identification code of the receiving controller has been established. As the broadcast of the receiving controller does not occur successfully, the identification code of the receiving controller must be reconciled with any received identification codes and must have a new resident identification code broadcasted at a new random time.

Figure 5:
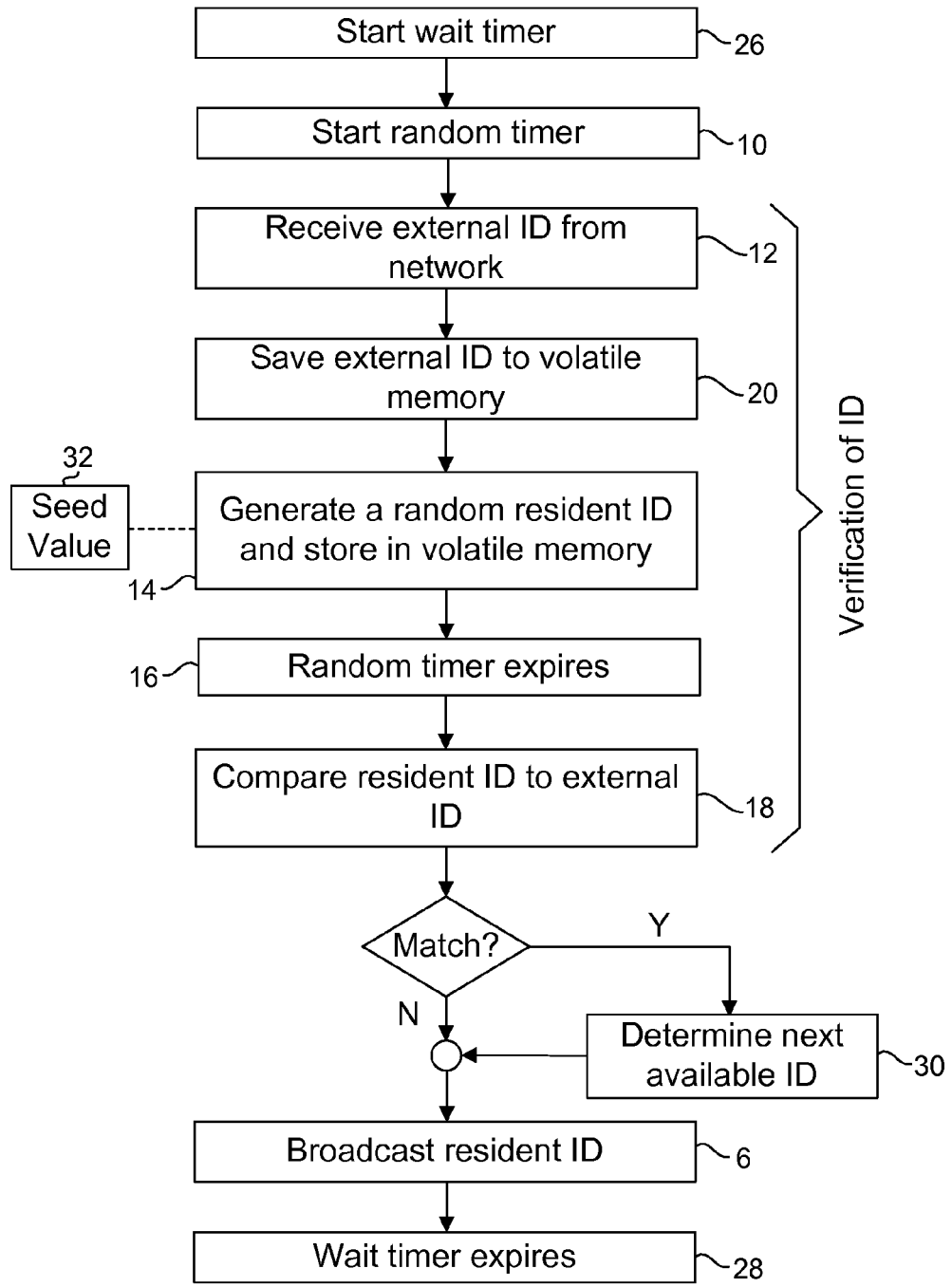
FIG. 5 is a flow diagram depicting another scenario in which a controller is initialized.

FIG. 5 is a flow diagram depicting another scenario in which a controller is initialized. This scenario occurs when an identification code has been established in at least one controller in a network of controllers. Again, similar to the case shown in FIG. 3, upon power-up, each controller first generates and starts a preprogrammed wait timer as shown in step 26 of FIG. 5, e.g., an amount of time sufficient for all of the permitted number of controllers in a network to establish their identification codes and waits until this identification code establishing phase has completed or when the wait timer has expired as shown in step 28. During the period in which the wait timer is active, the controller is configured to generate and start a timer of a random duration as in step 10. The receiver is configured for receiving an external identification code broadcasted from one of the other controllers as in step 12 and storing the external identification code in the volatile memory as in step 20 during the waiting period, i.e., before the wait timer expires. Note that, in this scenario, an identification code has been established in another controller which causes the broadcast of the identification code from the already established controller. The identification code is subsequently received as shown in step 12. Note that each broadcast from a controller causes step 12 to be taken. There can be multiple messages received prior to the expiration of the random timer. An identification code of a random value is then generated and stored in its volatile memory as in step 14. Upon the expiration 16 of the random timer, the external identification code is compared to the resident identification code as in step 18. If a match exists, the next available identification code is determined. For example, if the external identification code is "2" and "3" has not been taken and the rule for selecting an identification code is made according to an ascending order, the next logical identification code will be "3." If the rule for selecting an identification code is made according to a descending order and "1" has not been taken, the next logical identification code will be "1." The newly identified identification code is now ready to be broadcasted to the network as shown in step 6. If the resident identification code is not identical to the random code, the resident identification code is broadcasted to the communication network as in step 6. Upon expiration of the timer (step 16), the transmitter is configured for broadcasting the resident identification code to the communication network 4. The resident identification code is now the identification code of the controller from which the resident identification code has just been transmitted. A random value can be, but not limited to, the product of a random number generator or any portion of already established numeric characters and any combinations of alphabetic and numeric characters representing a physical quantity, e.g., temperature sensor reading, flowrate reading or an address, e.g., Media Access Control (MAC) address of a controller. In generating a resident identification code, i.e., a random number as shown in step 24, a seed value 32 is provided as an operand of the present random number generator. In order to achieve a random result, the seed value 32 must be random. In one embodiment, a resident identification code is the least significant digit of a number representing a physical quantity or an analog-to-digital output value of a physical quantity, e.g., a temperature sensor reading of a heat exchanger and a flowrate reading of a hot water heating system, etc. As an example, the random code generator takes a snapshot of a temperature sensor reading and parses the snapshot for the least significant digit in the form of an integer. This very same identification code may also be used as a factor determining the magnitude of the random timer. For instance, if the identification code is "6," the random timer may be 6×0.1 or 0.6 second, if a controller is configured to communicate at time interval of 0.1 second. The steps 12, 20 and 18 are collectively called the "verification of identification code" step. In summary, the method for uniquely self-identifying a controller within a network of controllers where the controller includes a unique identification code, includes:

(a) randomly generating a first identification code by the controller from a seed value;
(b) broadcasting the first identification code to the network of controllers;
(c) within a second controller within the network of controllers, comparing the first identification code to a second identification code of the second controller, where if the first identification code is identical to the second identification code, the second identification code is replaced by a third identification code that is created in the controller and if the first identification code is not identical to the second identification code, the second identification code is broadcasted to the communication network.

Figure 6:
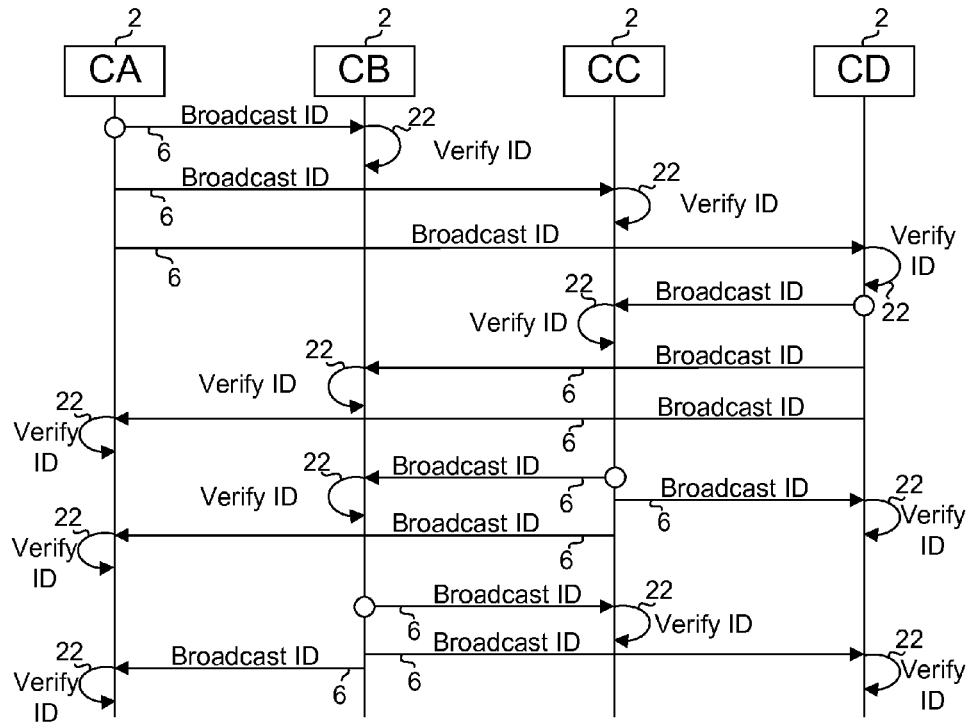
FIG. 6 is a sequence diagram depicting an example of the interactions of various controllers of FIG. 1 in an automatic self-identification process.

FIG. 6 is a sequence diagram depicting an example of the interactions of various controllers of FIG. 1 in an automatic self-identification process. As the network is routerless, the responsibility to assign an identification code to a controller must be shouldered by the controllers 2 connected to the network 4 shown in FIG. 1. Using the timers shown in FIG. 4, it shall be noted that the order in which the controllers is identified is CA-CD-CC-CB. As the random timer of CA expires first, its identification code is broadcasted first and received and verified according to steps 12, 20 and 18 of FIG. 5 by CB, CC and CD or step 22. Next, as the timer of CD expires, its identification code is broadcasted and received and verified according to steps 12, 20 and 18 of FIG. 5 by CC and CB and verified according to steps 12, 20 and 18 of FIG. 5 by CA as CA has already been identified. This is followed by the expiration of the timer of CC. The resident identification code of CC is broadcasted and received and verified by CB, CA and CD. As the last controller to be identified as its timer expires last, CB's broadcast of its resident identification code is verified by CA, CC and CD.

As an example, the wait timer of each controller in a network is 24 seconds. Assuming the resolution of the random timer of 1 second, up to 24 controllers can be identified within this timeframe. However, continuing on the example above, only four controllers are connected in the network. If the result of an analog-to-digital conversion of a temperature sensor reading is used in determining an identification code, the least significant digit of the result of "764" will be "4." If this same value is used in determining the value of the random timer, the random timer will be 4*1 second, i.e., 4 seconds. As CA is the first controller to be identified, the identification code of "4" will be unique. Therefore, at the $4^{th}$ second, CA will broadcast a message with an identification code of "4." Upon having taken the identification code of "4," no other controllers in the network can have this identification code. Upon receiving the broadcast from CA, CD now receives the information indicating that the next available identification is "5" assuming an ascending indexing scheme is chosen. If the random timer for CD is 7 seconds, at the $7^{th}$ second mark, CD will broadcast a message with an identification code of "5." Assuming that CC has a random timer of 12 seconds, at $12^{th}$ second, CC will broadcast a message with an identification code of "6." Finally, assuming that CB has a random timer of 17 seconds, at $17^{th}$ second, CB will broadcast a message with an identification code of "7." Therefore, by $17^{th}$ second, all four controllers would have been identified.

As another example, when one or more controllers is added to an already established network of controllers, a dynamic identification code establishing phase is said to be taking place. In this scenario, the one or more newly added controllers have not been identified and therefore do not have identification codes while all of the existing controllers in the established network have been identified with identification codes. If one controller, e.g., CE is added to the already established network of the controllers made up of CA, CB, CC and CD as described elsewhere herein, CE will power up according to the steps shown in FIG. 5. In a first aspect, if all of the established controllers broadcast at least one message within CE's random timer, CE will have received, as in step 12 of FIG. 5, at least one message, from each of CA, CB, CC and CD. As identification codes "4," "5," "6," and "7" have been taken and are not available, the next available identification code will be determined to be "8" in step 30 as "8" is the next logical number in the ascending order from the maximum number already taken, i.e., "7."

In a second aspect, if not all of the established controllers have broadcasted within CE's random timer, it is possible that a newly established identification code of CE can be the same as one of the already established identification codes of CA, CB, CC and CD. For instance, if CD has not been heard from within CE's random timer and CE, at the expiration of its random timer has established an identification code of "7," a later broadcast from CD will cause all of the controllers in the network to detect a condition where at least two controllers are having the same identification code of "7." When this condition is detected in a controller, the re-establishment of identification code is requested within each controller. The steps of FIG. 5 are again run to establish the identification code of each controller, as if each controller is powering up for the first time. However, any control functions currently performed by the previously established controllers will continue without interruptions.

Figure 7:
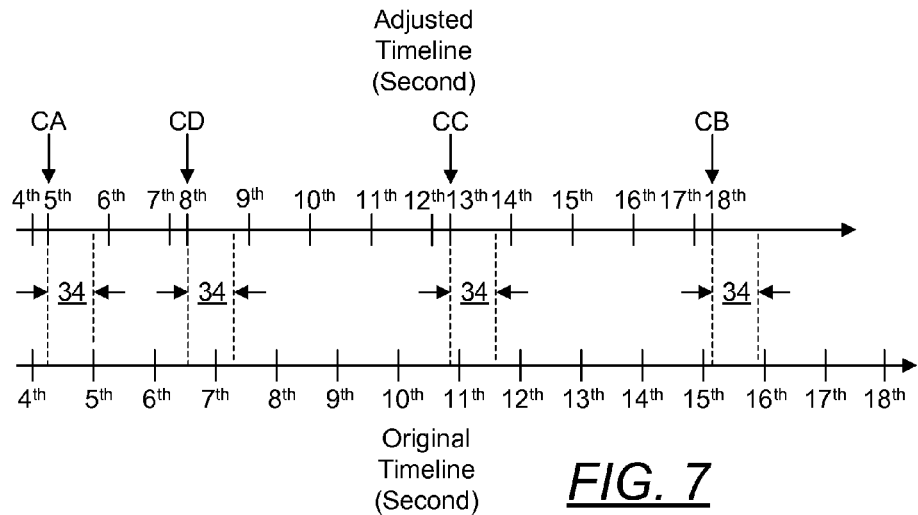
FIG. 7 depicts a mechanism for adjusting and reducing the magnitude of the wait timer of a controller yet to be identified.

FIG. 7 depicts a mechanism for adjusting and reducing the magnitude of the wait timer of a controller yet to be identified. Continuing with the example above, there are provided two timelines, the bottom timeline depicting a scenario where no time optimization is used and the top timeline depicting a scenario where a time optimization routine is applied in each controller. Only the portions of the timelines that are relevant to the present example are shown. As the processing time for establishing an identification code in a controller and broadcasting a notification message from the controller that an identification code has been established, can be much less than the resolution of the random timer (i.e., 1 second) in this example, the random timer of each controller can be adjusted each time an identification code has been established in a controller. In this example, as the identification code of CA has been established in an amount of time that is less than that of the resolution of its random timer, it becomes unnecessary for the still unestablished controllers to wait until the next tick mark, e.g., in this case the $5^{th}$ second mark. The timeline of each still unestablished controllers, i.e., CD, CC and CB is adjusted such that it begins with the next tick mark upon receiving a message indicating that CA has been established. At 8th second of the adjusted timeline, CD is now undergoing the process of getting identified. Again, as the identification code of CD has been established in an amount of time that is less than that of the resolution of its random timer, it becomes unnecessary for the still unestablished controllers to wait until the next tick mark, e.g., in this case the 8th second mark. The timeline of each still unestablished controllers, i.e., CC and CB is adjusted such that it begins with the next tick mark upon receiving a message indicating that CD has been established. At 12th second of the adjusted timeline, CC is now undergoing the process of getting identified. Again, as the identification code of CC has been established in an amount of time that is less than that of the resolution of its random timer, it becomes unnecessary for the still unestablished controllers to wait until the next tick mark, e.g., in this case the 13th second mark. The timeline of each still unestablished controllers, i.e., CB is adjusted such that it begins with the next tick mark upon receiving a message indicating that CC has been established. Finally, at 17th second of the adjusted timeline, CB is now undergoing the process of getting identified. It shall be noted that an amount of time saving 34 is gained after the identification process of a controller. The total amount of time savings is then commensurate with the number of controllers that are identified.

It shall be appreciated that the present system and method may be applied to the controllers of devices, e.g., water heaters, air heating and cooling devices, home comfort devices and other appliances, etc., where a total demand of these systems is met by varying contributions by individual members making up the systems.

While the methods, systems and devices have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following inventive concepts.

What is claimed herein is:

1. A routerless system for uniquely self-identifying a controller functionally connected to a communication network, said system comprising:
   at least two controllers connected to the communication network, each controller having:
      a random code generator configured for generating a resident identification code from a seed value, said seed value is at least a portion of a value selected from the group consisting of a temperature sensor reading, a flowrate reading, an analog-to-digital output value of said temperature sensor reading and an analog-to-digital output value of said flowrate reading;
      a transmitter;
      a receiver;
      a volatile memory; and
      a random timer configured to be started upon power-up of said each controller,
   wherein upon expiration of said random timer, said transmitter is configured for broadcasting said resident identification code to the communication network without an external request, said receiver is configured for receiving at least one external identification code broadcasted from at least one other controller of said at least two controllers and storing said at least one external identification code in said volatile memory, said at least one external identification code is compared to said resident identification code, if a match exists, said resident identification code is replaced by another resident identification code that is determined using a rule in said controller and if a match does not exist, said resident identification code is broadcasted to said communication network.

2. The routerless system of claim 1, each of said resident identification code and said external identification code is selected from the group consisting of one or more numeric characters, one or more alphabetic characters and a combination thereof.

3. The routerless system of claim 1, wherein said rule comprises selecting a next available resident identification code in an ascending order from said resident identification code.

4. The routerless system of claim 1, wherein said rule comprises selecting a next available resident identification code in a descending order from said resident identification code.

5. A method for uniquely self-identifying a controller within a routerless network of controllers, wherein each of the network of controllers is to be self-identified with a unique identification code, said method comprising:
   (a) randomly generating a first identification code by a first controller of the network of controllers from a seed value, said seed value is at least a portion of a value selected from the group consisting of a temperature sensor reading, a flowrate reading, an analog-to-digital output value of said temperature sensor reading and an analog-to-digital output value of said flowrate reading;
   (b) starting a random timer upon power-up of said first controller and upon expiration of said random timer, broadcasting said first identification code to the network of controllers without an external request; and
   (c) within a second controller within the network of controllers, comparing said first identification code to a second identification code generated of said second controller, wherein if said first identification code is determined to be identical to said second identification code, said second identification code is replaced by another resident identification code that is determined using a rule in said controller and if said first identification code is not identical to said second identification code, said second identification code is adopted as the identification code of said second controller and said second identification is broadcasted to the network of controllers.

6. The method of claim 5, wherein each of said first identification code and said second identification code is selected from the group consisting of one or more numeric characters, one or more alphabetic characters and a combination thereof.

7. The method of claim 5, wherein said rule comprises selecting a next available resident identification code in an ascending order from said second resident identification code.

8. The method of claim 5, wherein said rule comprises selecting a next available resident identification code in a descending order from said second resident identification code.

* * * * *